P. R. SEAMON.
MIRROR SUPPORT.
APPLICATION FILED AUG. 23, 1912.
1,063,220.
Patented June 3, 1913.
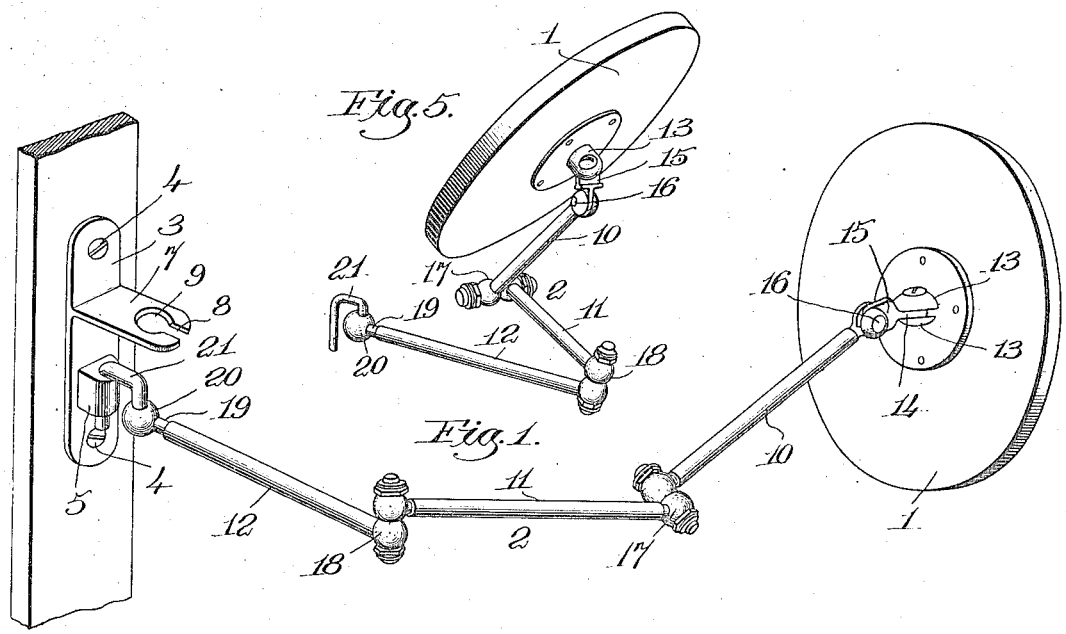
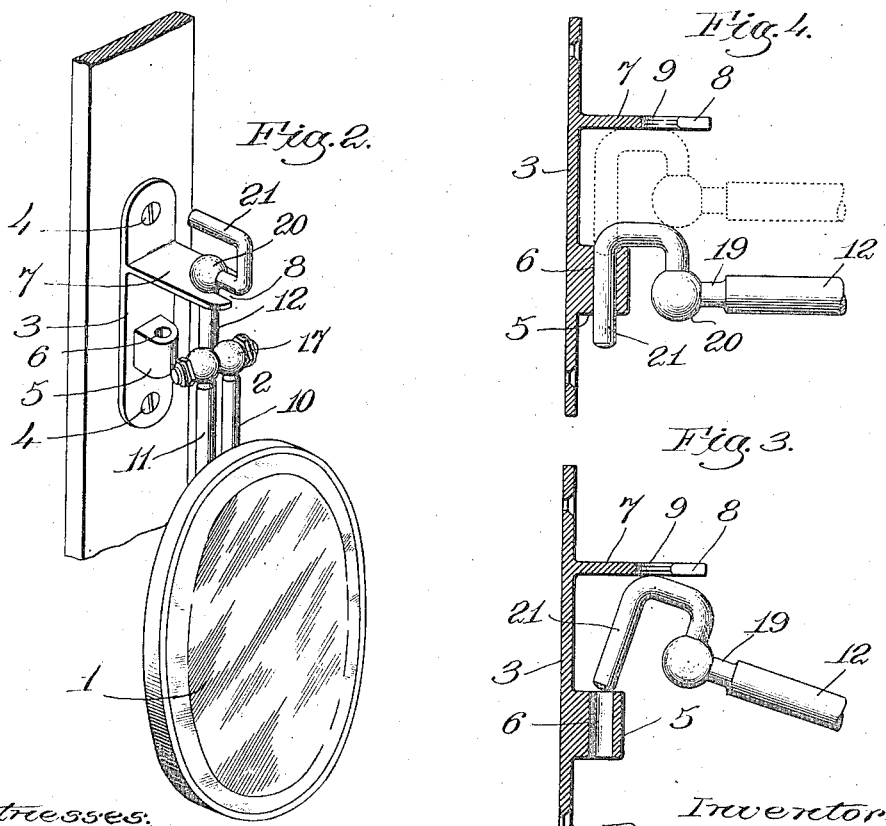
Witnesses.
Thomas J. Drummond.
Warren O'Neil.
Inventor.
Percy R. Seamon.
by Edwards Hard & Smith
attys.

UNITED STATES PATENT OFFICE.

PERCY R. SEAMON, OF BOSTON, MASSACHUSETTS, ASSIGNOR OF FIFTY-ONE ONE-HUNDREDTHS TO GEORGE R. HUSSEY AND NINETEEN ONE-HUNDREDTHS TO HARRY R. WHEELER, OF PROVIDENCE, RHODE ISLAND.

MIRROR-SUPPORT.

1,063,220.     Specification of Letters Patent.     Patented June 3, 1913.

Application filed August 23, 1912. Serial No. 716,589.

*To all whom it may concern:*

Be it known that I, PERCY R. SEAMON, a citizen of the United States, residing at Boston, county of Suffolk, State of Massachusetts, have invented an Improvement in Mirror-Supports, of which the following description, in connection with the accompanying drawing, is a specification, like characters on the drawing representing like parts.

This invention relates to a universally-adjustable mirror support and has for its object to provide a novel construction by which the mirror can be readily adjusted into any one of a variety of positions, either in a vertical direction, or a lateral direction, and to provide a support which can be readily disconnected from the wall and hung onto the supporting bracket, so as to be folded flat against the wall; and to otherwise improve mirror supports of this character, all as will be more fully hereinafter described and then pointed out in the appended claims.

Referring to the drawings wherein I have shown a selected embodiment of my invention, Figure 1 is a perspective view showing the mirror support in position for sustaining the mirror; Fig. 2 shows the mirror support folded and the mirror hung from the sustaining bracket; Fig. 3 shows the manner of removing the folding arm from the bracket; Fig. 4 is a vertical section through the bracket showing the end of the arm supported thereby; Fig. 5 shows the mirror support folded to constitute a stand for the mirror.

1 designates the mirror which may have any suitable or usual construction, it being herein shown as circular in shape; 2 designates generally a folding arm by which the mirror is supported, and 3 a bracket adapted to be secured to the wall and by which the arm is sustained. The bracket 3 is shown as in the form of a plate which is adapted to be secured to the wall by screws 4, or other means, and which is provided with a boss 5 having an aperture 6 therethrough. Situated above the boss is a laterally-extending flange 7 having a slot 8 formed therein, which slot is enlarged at its inner end, as shown at 9. The folding arm 2 is made up of a plurality of sections 10, 11 and 12 which are hinged together, and said arm is connected to the back of the mirror by a sort of universal joint. The mirror is shown as having two ears 13 extending therefrom between which is pivoted the arm 14 of a hinge member 15, said hinge member being pivoted at 16 to the section 10, so that the axis of the joint between the hinge member 15 and the section 10 is at right angles to the axis of the joint between said member 15 and the mirror 1. This allows the mirror to be swung about two different axes at right angles to each other and gives a universal joint movement to the mirror.

The section 10 of the arm is hinged to the section 11 by a joint 17 and the section 11 is hinged to the section 12 by another joint 18, said joints 17 and 18 being constructed with their axes at right angles to each other so as to provide for swinging the sections of the arm into different desired positions. These joints 17 and 18 may have any suitable construction, but will preferably be such as to develop sufficient friction to hold the arm sections in any adjusted position. The end of the section 12 of the arm is provided with a neck 19 of a size to enter the slot 8 and with a head 20 which is larger than the enlarged portion 9 of the slot. This head 20 has a goose-neck finger 21 extending therefrom, which finger is adapted to enter the aperture 6 in the boss 5.

When the mirror is to be used the finger 21 is inserted into the aperture 6 and the sections of the folding arm 2 are adjusted so as to bring the reflecting surface of the mirror in the desired position. The connection between the folding arm 2 and the bracket 3 permits the folding arm to be swung in a horizontal plane, and the various joints in the arm permit the mirror to be placed in any desired position, as usual in devices of this class.

The flange 7 acts as a sort of guard to prevent the arm 2 from being accidentally disengaged from the boss 5. This bracket is so situated that the distance between its lower face and the boss 5 is slightly less than the distance from the extremity of the finger 21 and the top thereof, so that when the folding arm 2 is lifted vertically until the bend of the finger strikes the flange 7, the lower end of the finger is not quite clear of the aperture 6. The arm can be removed from the bracket, however, by tipping it slightly when the finger is nearly withdrawn from the aperture, as shown in Fig. 3. Similarly, the finger 21 can be inserted into the aperture by first entering the extremity of the finger into the aperture while the arm is at a slightly inclined position and then bringing the arm in horizontal position with the finger in alinement with the aperture.

The slot 8 in the flange 7 and the neck 19 provide means for hanging up the mirror flat against the wall with the arm 2 folded, as shown in Fig. 2. In this position the mirror is entirely out of the way and, moreover, the mirror is sustained at a lower level than the bracket 3 and can, therefore, be used by children or other persons of short stature.

In Fig. 5 I have shown the folding arm arranged to act as a stand for supporting the mirror. By folding the arms 11 and 12 at an angle to each other to form a triangular base to rest on a table and then swinging the arm 10 upwardly at a proper angle, the bracket will make a firm stand to support the mirror on a table or bureau.

Having fully described my invention, what I claim as new and desire to secure by Letters Patent is:—

In a mirror support, the combination with a bracket in the form of a supporting plate adapted to be secured to a wall and having a boss rigid therewith and extending laterally therefrom, said boss having a vertically-extending aperture, of a folding arm provided at its end with a supporting finger which has a portion extending laterally from said arm, a portion extending parallel thereto, and another laterally-extending portion parallel to the first-named portion but of sufficient length to extend across the end of the arm, said latter portion being separated from said end and adapted to enter the aperture in the boss, a slotted guard flange rigid with the supporting plate and extending laterally therefrom above the boss, the distance between the guard flange and the top of the boss being slightly less than the length of the last-named laterally-extending portion of the supporting finger and the slot in said guard flange being situated to permit the supporting finger to be withdrawn from the apertured boss when the arm is lifted as far as the guard flange will permit and then tilted slightly, and a mirror sustained by said arm.

In testimony whereof, I have signed my name to this specification, in the presence of two subscribing witnesses.

PERCY R. SEAMON.

Witnesses:
 LOUIS C. SMITH,
 THOMAS J. DRUMMOND.